United States Patent
Larimore et al.

(10) Patent No.: US 9,644,420 B1
(45) Date of Patent: May 9, 2017

(54) EMERGENCY SHELTER WITH IMPROVED DOOR LATCHING ASSEMBLY

(71) Applicant: SWISHER ACQUISITION, INC., Warrensburg, MO (US)

(72) Inventors: Scott David Larimore, Warrensburg, MO (US); Samuel David Renner, Warrensburg, MO (US)

(73) Assignee: Swisher Acquisition, Inc., Warrensburg, MO (US)

( * ) Notice: Subject to any disclaimer, the term of this patent is extended or adjusted under 35 U.S.C. 154(b) by 0 days.

(21) Appl. No.: 15/153,444

(22) Filed: May 12, 2016

(51) Int. Cl.
| | |
|---|---|
| *E04H 9/00* | (2006.01) |
| *E06B 5/10* | (2006.01) |
| *E05B 65/08* | (2006.01) |
| *E05C 9/02* | (2006.01) |
| *E05B 65/10* | (2006.01) |
| *E05C 1/06* | (2006.01) |
| *E05B 17/20* | (2006.01) |

(Continued)

(52) U.S. Cl.
CPC .............. *E06B 5/10* (2013.01); *E04H 9/04* (2013.01); *E04H 9/145* (2013.01); *E05B 17/2007* (2013.01); *E05B 65/0888* (2013.01); *E05B 65/1006* (2013.01); *E05C 1/06* (2013.01); *E05C 9/025* (2013.01); *E05C 9/10* (2013.01); *E06B 5/113* (2013.01); *E05B 2065/0805* (2013.01)

(58) Field of Classification Search
CPC ... E06B 5/10; E06B 5/113; E05C 1/06; E05C 9/025; E05C 9/10; E05B 17/2007; E05B 65/0888; E05B 65/1006; E05B 2065/0805; E04H 9/145; E04H 9/04; E04H 2065/0805; Y10S 292/46; Y10S 292/68

USPC ................. 292/161, 173, 188, 143
See application file for complete search history.

(56) References Cited

U.S. PATENT DOCUMENTS

| | | | | |
|---|---|---|---|---|
| 5,542,720 A | * | 8/1996 | Fleming | .................. E05B 63/20 292/32 |
| 7,942,027 B1 | * | 5/2011 | Cassini | .................. E05B 13/004 292/100 |

(Continued)

*Primary Examiner* — Patrick J Maestri
(74) *Attorney, Agent, or Firm* — Hovey Williams LLP

(57) ABSTRACT

An emergency shelter includes a number of reinforced walls that define a substantially enclosed interior space in which people can enter in emergencies; a doorway opening formed in at least one of the walls to permit entry into and exit from the interior space; a door mounted over that doorway opening; and a latching assembly for latching and locking the door in its closed position. The door is configured to slide horizontally relative to the doorway opening between an open position and a closed position so that it can be opened even when debris is blown up against it. The shelter also includes a door jamb adjacent the doorway opening for receiving and partially surrounding a leading edge of the door to prevent movement of the door along an axis transverse to the horizontal sliding direction of the door so that the door does not cave in when struck by debris. A flange on the trailing edge of the door overlaps a flange on the front wall when the door is closed to prevent movement of the door along an axis transverse to the horizontal sliding direction of the door so that the trailing edge of the door does not cave in when struck by debris. The latching assembly securely latches and locks the door in its closed position but permits the door to be opened even when portions of the latching assembly are damaged.

14 Claims, 15 Drawing Sheets

(51) Int. Cl.
*E04H 9/04* (2006.01)
*E04H 9/14* (2006.01)
*E06B 5/11* (2006.01)
*E05C 9/10* (2006.01)

(56) References Cited

U.S. PATENT DOCUMENTS

| | | | | |
|---|---|---|---|---|
| 2006/0080912 A1* | 4/2006 | Shedd | ................ | E05B 65/0876 52/204.1 |
| 2009/0107061 A1* | 4/2009 | Guthrie | ................... | E06B 5/10 52/207 |
| 2014/0053489 A1* | 2/2014 | Bryant | ...................... | E06B 3/72 52/456 |

* cited by examiner

EMERGENCY SHELTER WITH IMPROVED DOOR LATCHING ASSEMBLY

BACKGROUND

Emergency shelters are often installed in or near houses and other structures to protect occupants from tornadoes, storms, intruders, and other dangers. Emergency shelters can be installed either below ground or above ground. Below ground shelters provide excellent protection from storms and other dangers, but they suffer from several problems including being difficult and costly to install, difficult to quickly access in emergencies, more prone to flooding from heavy rains and/or broken water lines, and sometimes difficult to exit when debris is blown over their doors. Properly-anchored above ground shelters also provide excellent protection from storms and other dangers, but do not suffer from many of the above-mentioned problems. However, conventional above ground shelters suffer from several problems too, including having outwardly swinging doors that can become blocked by debris or inwardly swinging doors that can be blown open in severe storms. Moreover, conventional above ground shelters rely on hinges for mounting their doors and for locking the doors, but hinges can be sheared off during severe storms and/or pried off by intruders, and can fail if struck by debris and/or can become stuck in their locked positions and thus prevent opening of their associated doors.

SUMMARY

The present invention solves the above-described problems and provides a distinct advance in the art of emergency shelters. More particularly, embodiments of the present invention provide an above-ground emergency shelter with a door and a latching assembly that are less prone to blockage by debris during storms; less likely to be damaged by high winds, debris, or intruders; less likely to open inadvertently because of high winds; and less likely to become locked or jammed in their closed and locked positions.

An emergency shelter constructed in accordance with an embodiment of the invention broadly comprises a number of reinforced walls that define a substantially enclosed interior space in which people can enter in emergencies; a doorway opening formed in at least one of the walls to permit entry into and exit from the interior space; a door mounted over the doorway opening; a unique door jamb for supporting the door; and a latching assembly for latching and locking the door in its closed position.

In accordance with an important aspect of the invention, the door is mounted so it slides horizontally relative to the doorway opening between an open position and a closed position. This configuration eliminates the need for door hinges that can break when subjected to extreme forces and ensures the door can be opened even when debris is blown up against it. The horizontal sliding movement of the door also reduces the likelihood that it will unintentionally open when subjected to high winds and eliminates any clearance issues associated with outward swinging doors.

In accordance with another important aspect of the invention, the door jamb surrounds the inside of the door when it is closed to support the door against high winds and debris. The door jamb also assists with latching and locking of the door and protects the latching assembly against damage.

The latching assembly is constructed and configured so that it securely latches and locks the door in its closed position. An embodiment of the latching assembly comprises a number of latch pins mounted in holes of the doorjamb; a latch bar mounted to the door for engaging the latch pins when the door is closed; a lock secured to the door for locking the latch in its latched position; and a secondary locking pin for locking the door from within the shelter and locking the latch in its latched position.

In accordance with another important aspect of the invention, the latch pins may be removed from the door jamb even when the latch is in its latched position and the lock is in its locked position. This permits an occupant of the shelter to remove the latch pins and the secondary locking pin and open the sliding door even when components of the latching assembly are jammed shut or otherwise damaged.

The lock and secondary locking pin lock the latch bar in its latched position. The secondary locking pin can only be accessed from inside the shelter and thus prevents an intruder or other person from opening the door from the exterior of the enclosure even with a key to the lock.

In accordance with another important aspect of the invention, the lock does not allow the door to open even if it is sheared off or otherwise rendered inoperable. This is because the purpose of the lock is to prevent the latch from shifting from its unlatched position, not to secure the door itself. In other words, the lock secures the latch and not the door itself.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
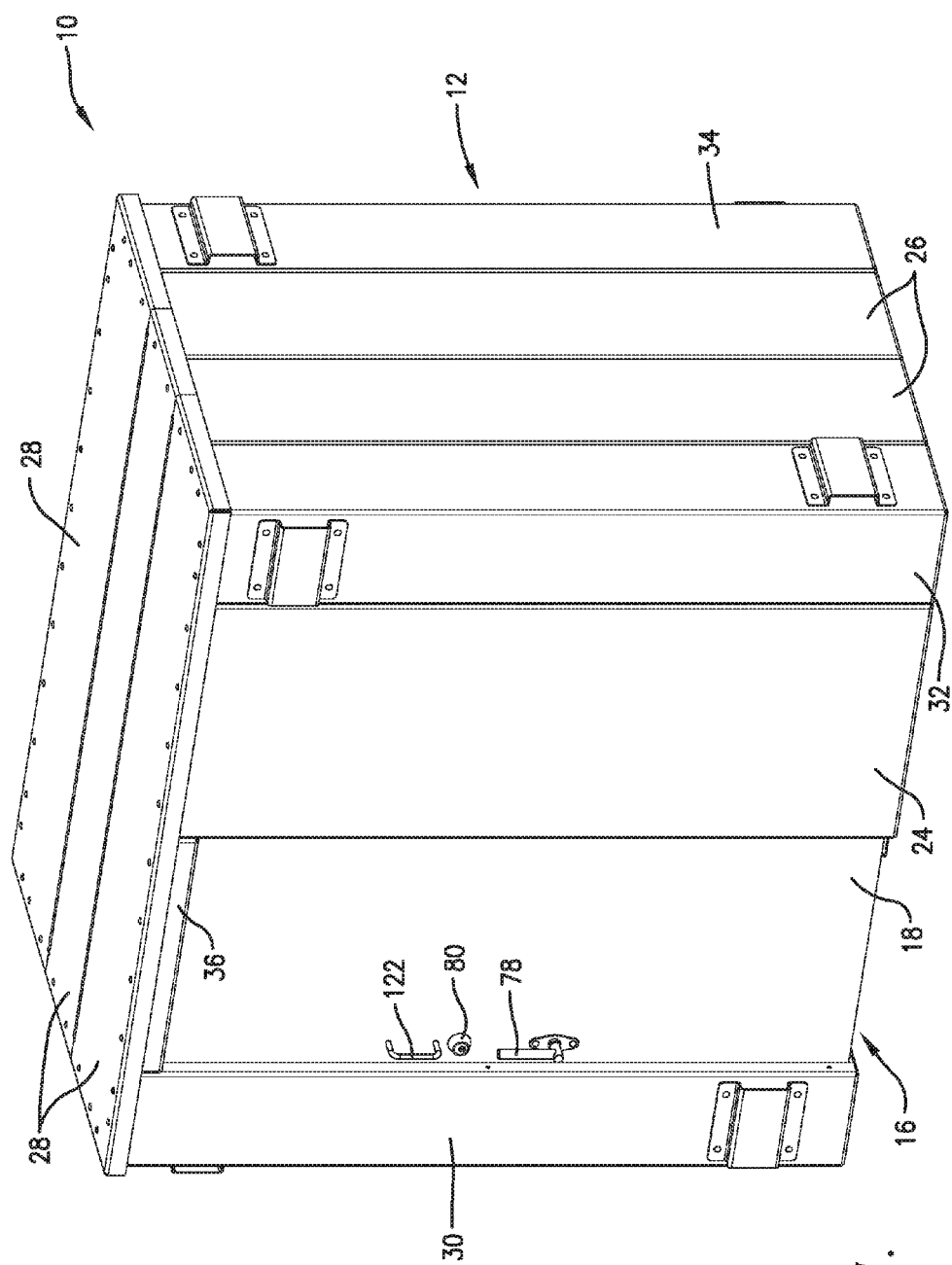
FIG. 1 is an exterior perspective view of an emergency shelter constructed in accordance with an embodiment of the invention with the door of the shelter in its closed position.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

An emergency shelter 10 constructed in accordance with various embodiments of the invention is illustrated in the attached drawing figures. The emergency shelter 10 provides protection from tornadoes, storms, intruders, and other dangers and may be installed anywhere such as in or near a house, office, or other building. The shelter may be constructed in any manner, formed in any size, and made from any suitable materials, but is preferably constructed of modular steel-reinforced components that may be shipped to an installation site and assembled in-place. As described in more detail below, the shelter 10 has an improved door assembly and latching assembly that are less prone to blockage by debris during storms; less likely to be damaged by high winds, debris, or intruders; less likely to open inadvertently because of high winds; and less likely to become locked or jammed shut.

Figure 2:
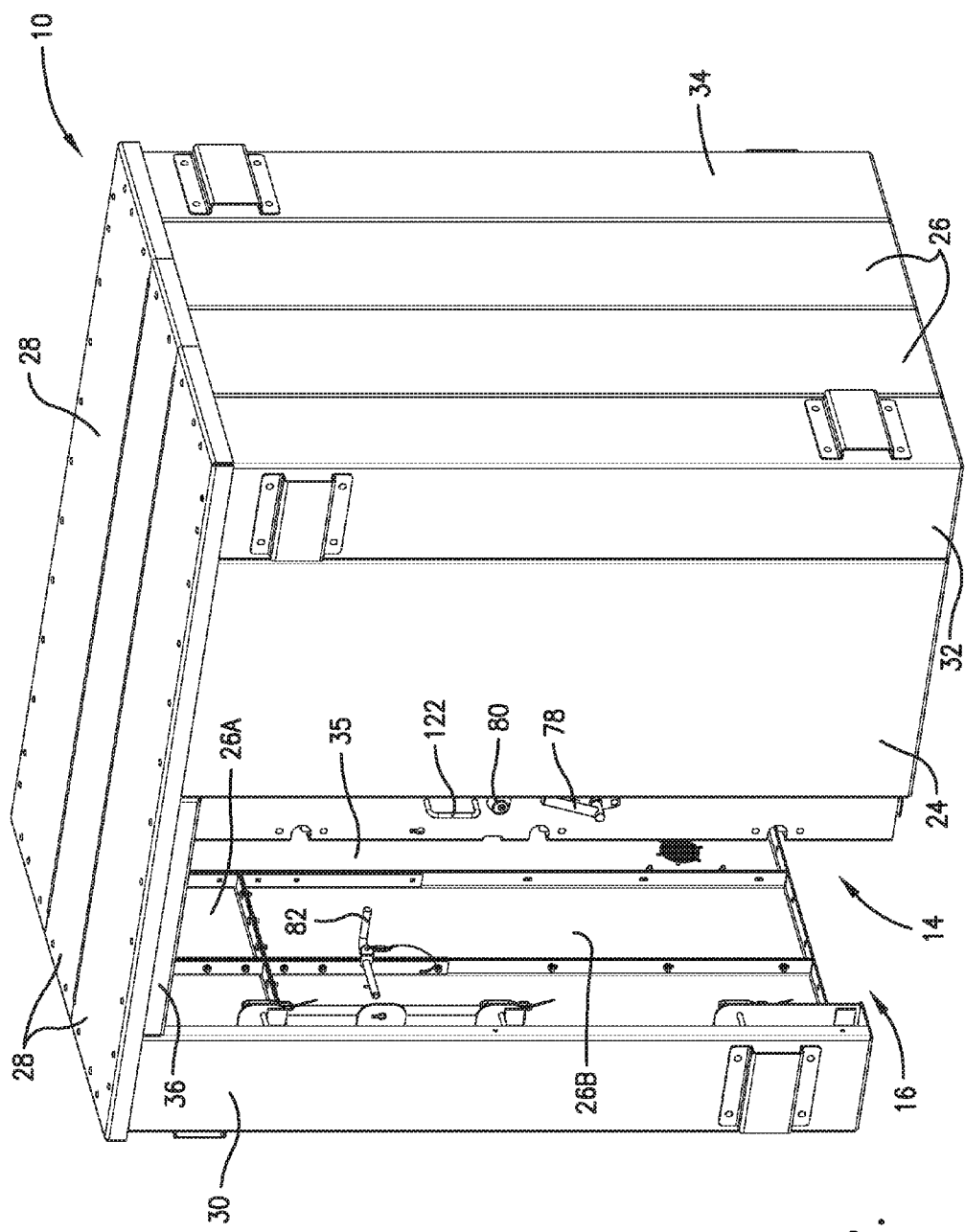
FIG. 2 is another exterior perspective view of the emergency shelter with its door open.
Figure 3:
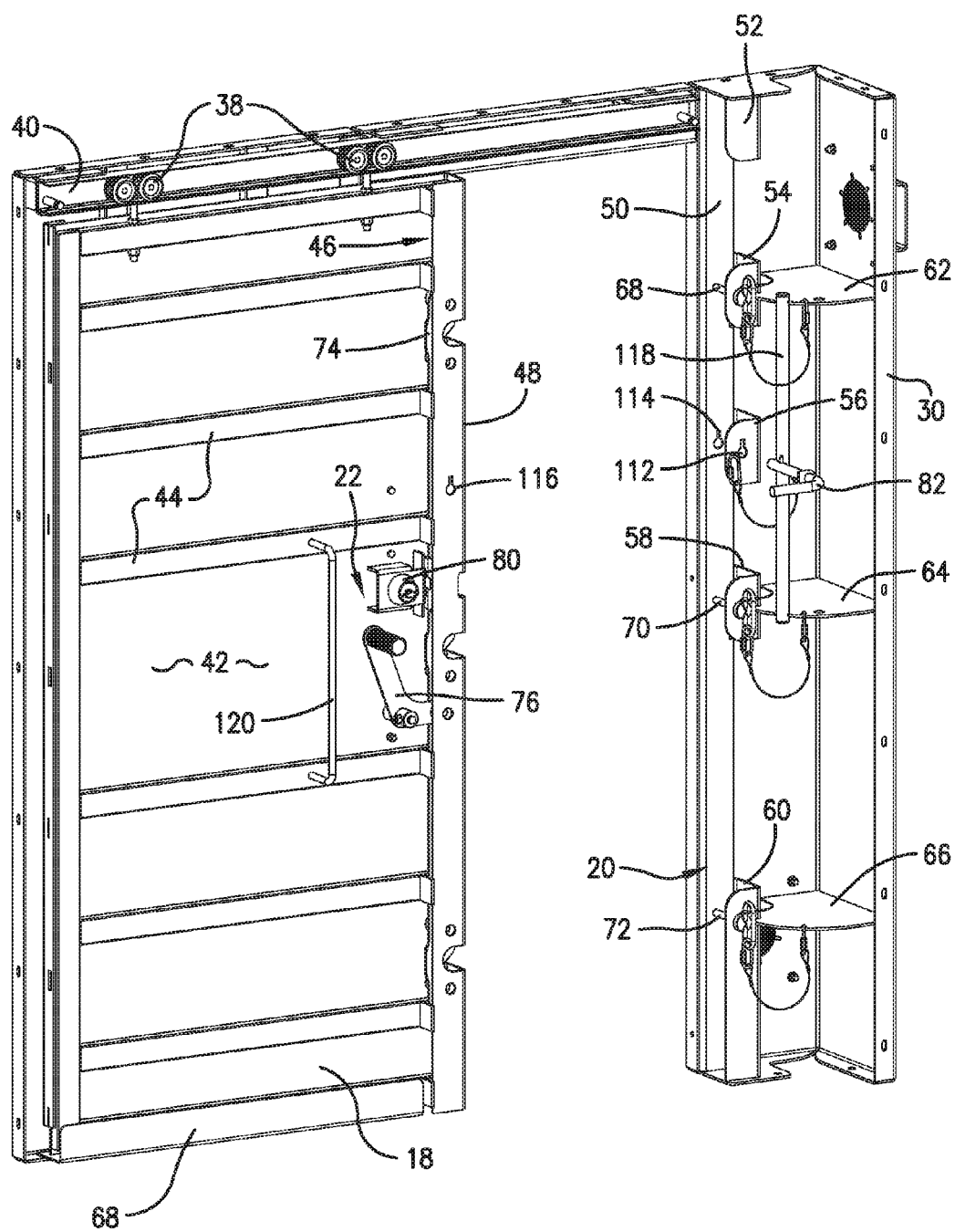
FIG. 3 is an interior perspective view of the shelter doorway, door, and latching assembly, with the door in its open position.
Figure 4:
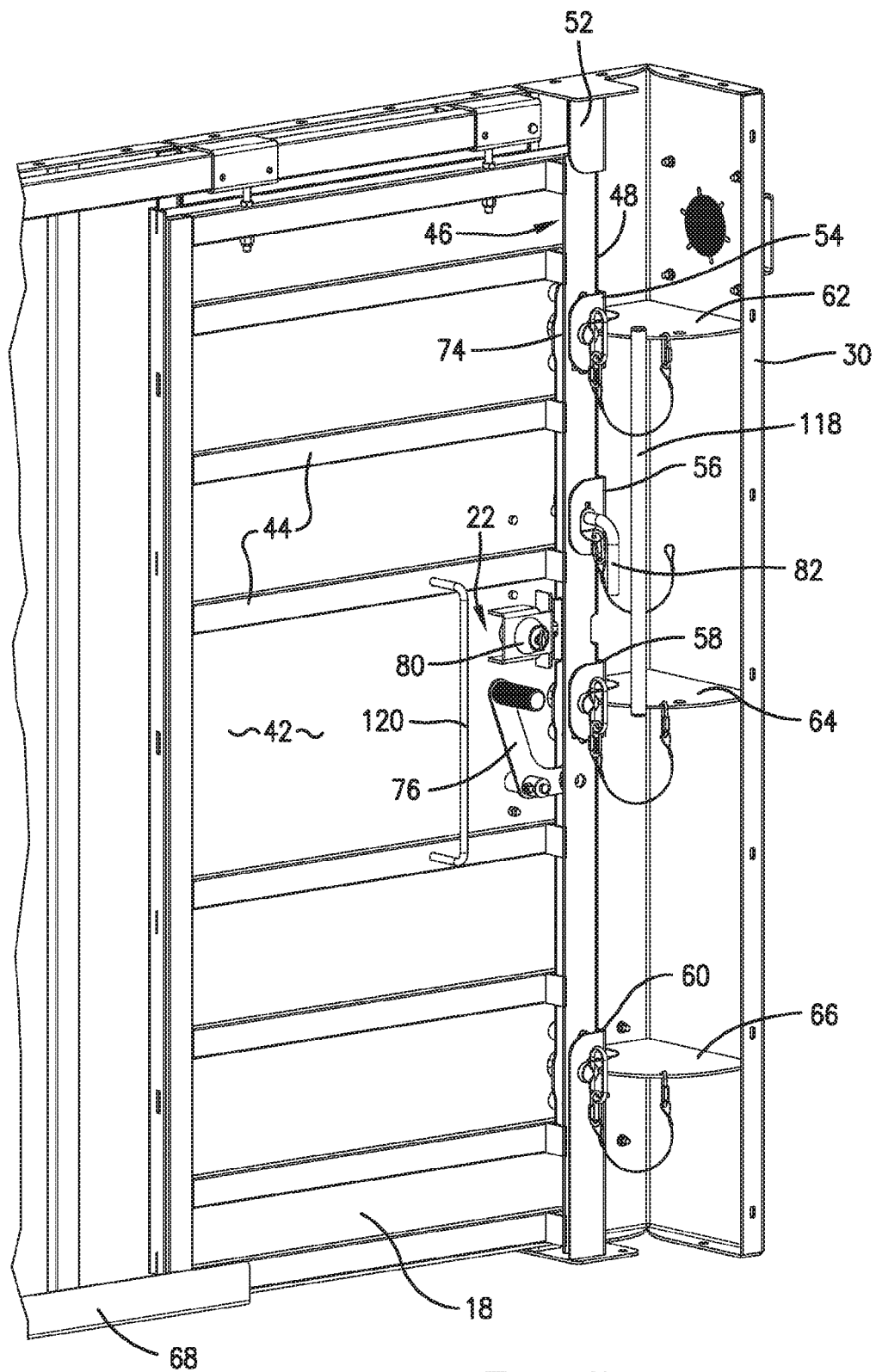
FIG. 4 is another interior perspective view of the shelter doorway, door, and latching assembly, with the door in its closed position and the latching assembly in its latched and locked position.

Referring initially to FIGS. 1, 2, and 3, an embodiment of the emergency shelter 10 broadly comprises a number of walls 12 that define a substantially enclosed interior space 14 in which people can enter in emergencies; a doorway opening 16 formed in at least one of the walls to permit entry into and exit from the shelter; a door 18 mounted over that doorway opening; a door jamb 20 for protecting and ensuring proper closing of the door; and a latching assembly 22 for latching and locking the door in its closed position. Each of these components and assemblies are discussed in more detail below.

The walls 12 may be made of any suitable material, and in one embodiment, are made of reinforced steel or other metals. The shelter may include any number, size, and shape of walls to form a protected interior space of any size and shape. In one embodiment, the shelter is in the shape of a rectangular cube and includes a front wall panel 24, a number of side wall panels 26, a number of rear wall panels (not shown), a number of roof panels 28, two front corner panels 30, 32, and two rear corner panels 34, 35 that are interconnected by bolts or other fasteners and that are secured to a concrete pad or other support surface by anchor bolts or other suitable fasteners. In some embodiments of the invention, one or more of the wall panels, such as the panel 26, has interconnected upper and lower sections 26A, 26B that can be disassembled from within the shelter so that both sections 26A, 26B can be removed to provide an emergency exit when the door 18 cannot be opened. Some of the panels, such as the side wall panels and/or rear wall panels, may be omitted when the shelter is installed against a reinforced wall and/or corner.

The doorway opening 16 provides access to the shelter and may be positioned in any of the walls of the shelter 10. In one embodiment, the doorway opening 16 is defined by a gap between the front wall panel 24 and the left front corner panel 30. The doorway opening 16 may be of any size and shape, and in one embodiment is large enough to accommodate a wheelchair. An upper doorway brace 36 spans the gap between the front wall panel 24 and the left front corner panel 30 to reinforce the doorway opening.

The door 18 is mounted adjacent the doorway opening 16 and is configured to slide horizontally between an open position shown in FIG. 2 and a closed position shown in FIG. 1. The horizontal sliding movement of the door prevents it from slamming shut or blowing open when exposed to high winds and permits it to be opened even when debris is blown up against it. In one embodiment, the door is suspended over the doorway opening by roller mechanisms 38 attached to the top of the door that ride in a track 40 above the door. The horizontal sliding movement of the door and the roller mechanisms 38 eliminate the need for door hinges, which are prone to failure when exposed to extreme forces.

The door 18 may be formed by any suitable materials. As best shown in FIG. 3, an embodiment of the door 18 is formed from a steel skin 42 or panel welded to a reinforced steel frame 44. The right edge of the panel when viewed from the perspective of FIG. 3 is folded to define a U-shaped channel 46 within a leading edge 48 of the door.

The door jamb 20 surrounds the leading edge of the door when its closed to support the door against high winds and debris. In one embodiment, the door jamb is formed in the corner wall 30 panel and includes a vertically extending plate 50 and five L-shaped metal flanges 52, 54, 56, 58, 60 that extend inwardly from the vertical plate 50 to define door pockets for receiving the leading edge 48 of the door 18. When the door 18 is closed, the plate 50 prevents the door from moving out and away from the shelter, and the metal flanges 52-60 prevent the door from being pushed into the shelter. Several of the flanges 54, 58, 60 may be further supported by a horizontally extending corner jamb support plates 62, 64, 66. An L-shaped door guide 68 is bolted or otherwise fastened to the lower inside edge of the front panel for guiding the sliding movement of the door 18.

Figure 16:
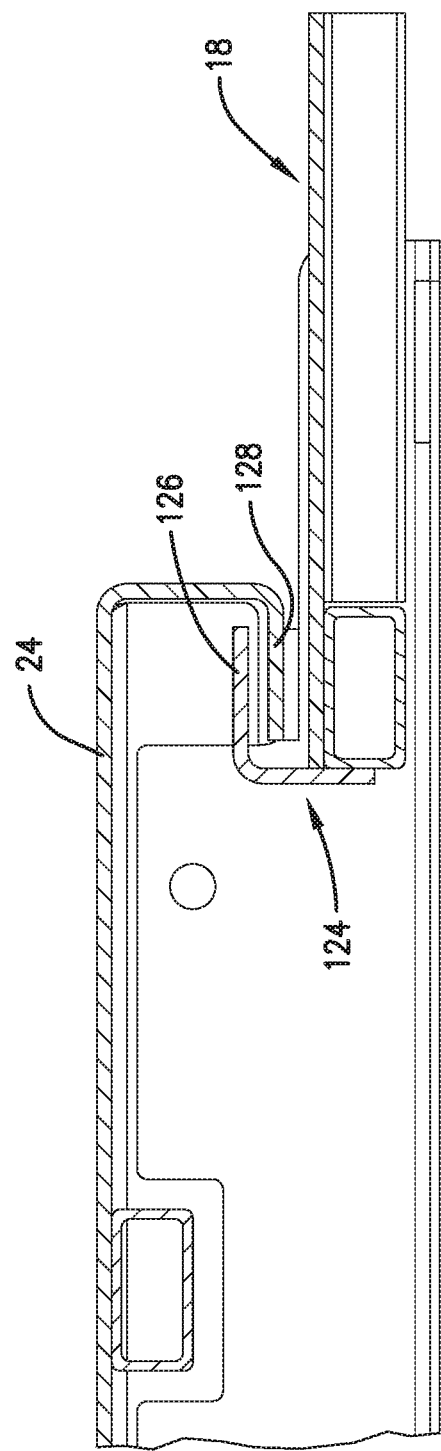
FIG. 16 is a horizontal cross section of the shelter door and front wall panel showing the interlocking of the trailing edge of the door with a flange on the front wall panel when the door is closed.

The trailing edge 124 of the door 18 is also folded to form a flange 126 as shown in FIG. 16. This door flange 126 interlocks with a corresponding flange 128 on the front wall panel to support the trailing edge of the door when it's closed. Thus, both the leading edge 48 and the trailing edge 124 of the door are fully supported when the door is closed to prevent the door from collapsing during extreme storms.

The latching assembly 22 securely latches and locks the door 18 in its closed position. An embodiment of the latching assembly is best shown in FIGS. 3, 4, 5, and 6 and broadly comprises a number of latch pins 68, 70, 72; a latch bar 74 for engaging the latch pins; interior and exterior latch handles 76, 78 for shifting the latch bar between its latched and unlatched positions; a lock 80 for locking the latch in its latched position; and a secondary locking pin 82 for further locking the latch in its latched position. Specific embodiments of these components are described in more detail below.

Figure 8:
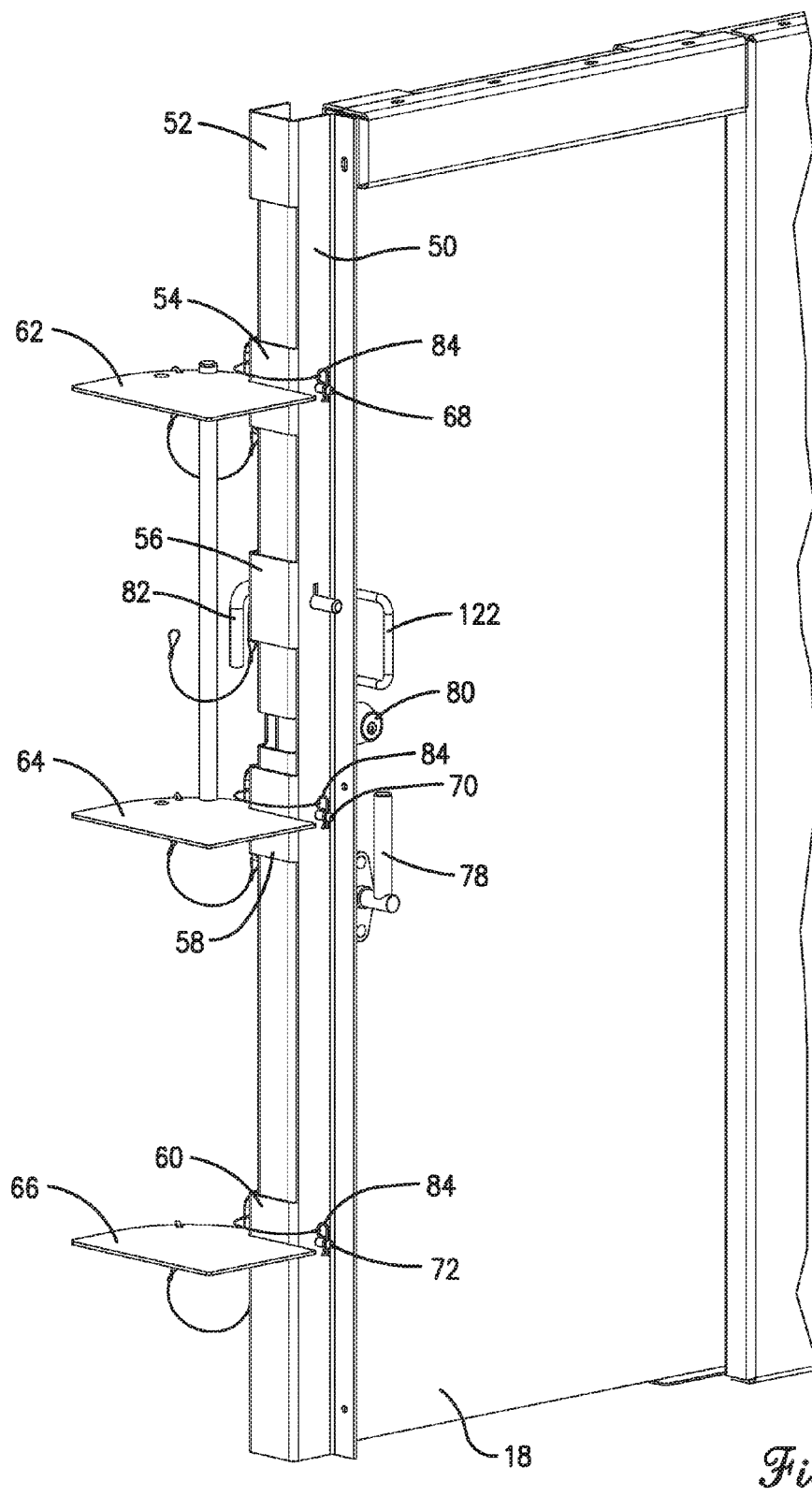
FIG. 8 is an exterior perspective view of the shelter door and door jamb showing the latching assembly in its latched and locked position.
Figure 9:
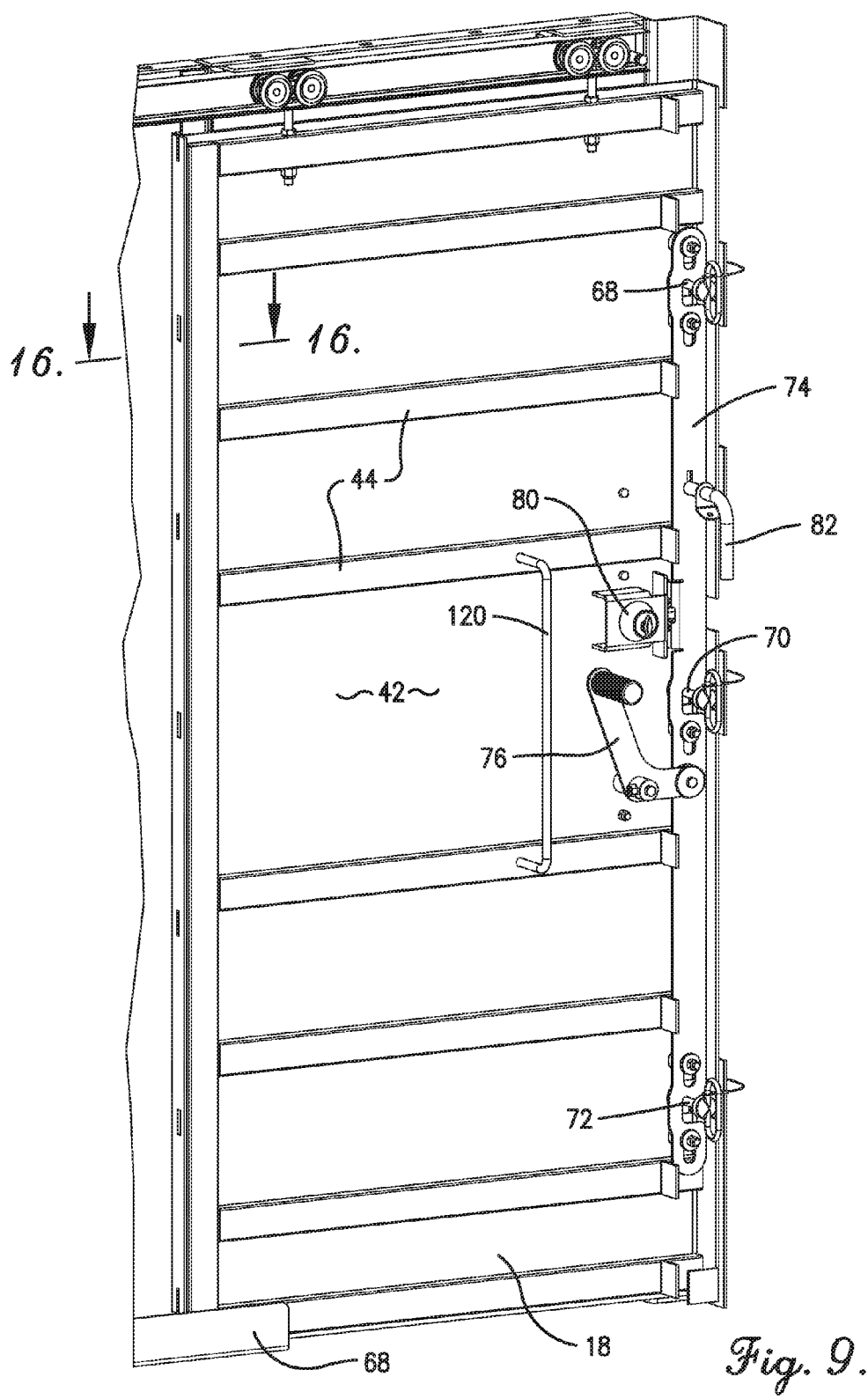
FIG. 9 is a partial vertical sectional view of the shelter door showing the latching assembly in its latched and locked position.
Figure 10:
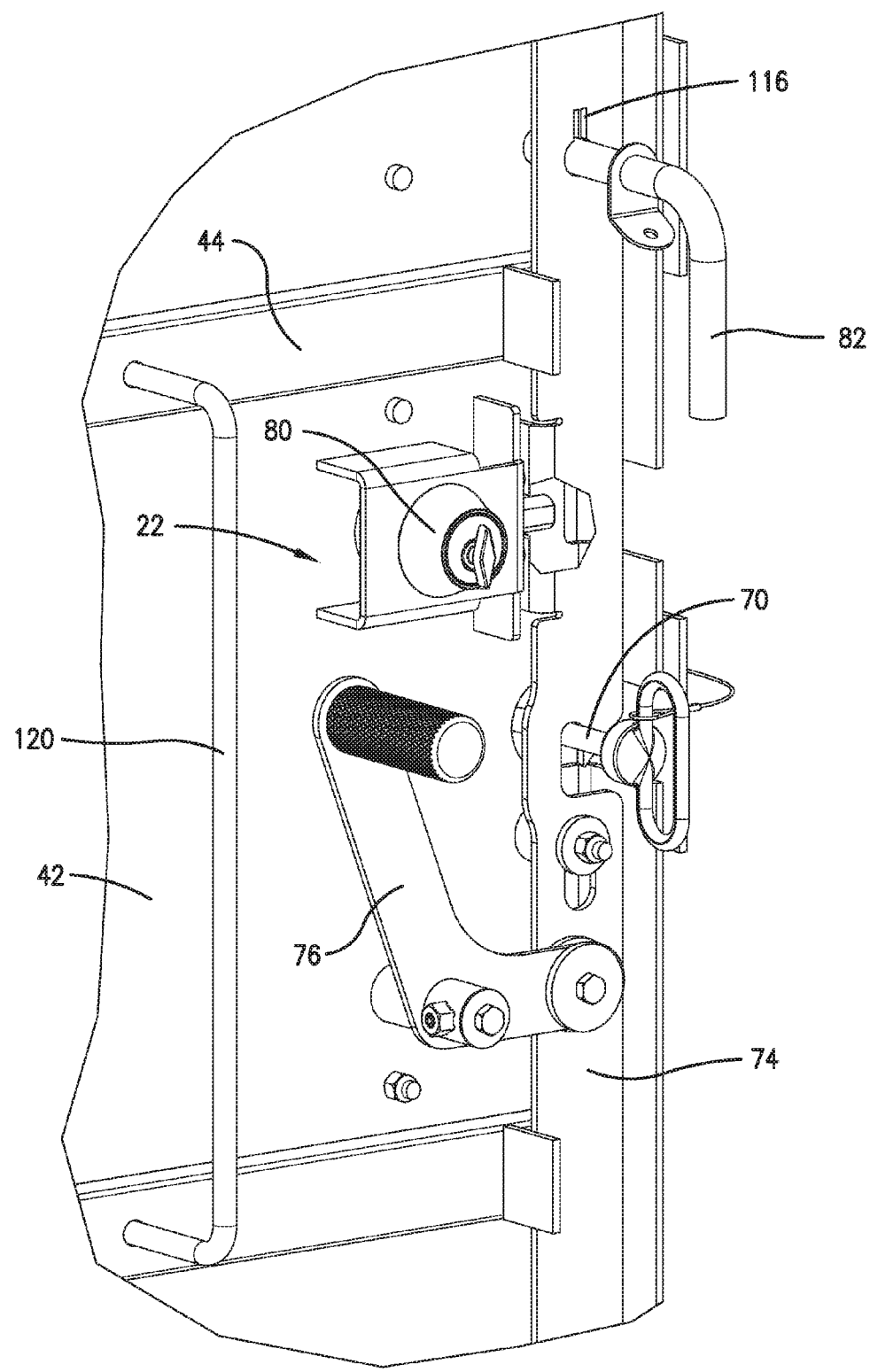
FIG. 10 is an enlarged view of portions of FIG. 9 showing the latching assembly in its latched and locked position.

The latch pins 68, 70, 72 are integrated in the door jamb 20 and cooperate with the latch bar 74 to latch the door 18 in its closed position. The shelter 10 may include any number of latch pins, with one embodiment including three latch pins mounted horizontally in holes of the flanges 54, 58, 60 and the bar 50. The latch pins 68, 70, 72 are secured within the holes by removable cotter pins 84 or similar mechanisms as best shown in FIG. 8. The latch pins 68, 70, 72 may be removed from the door jamb 20 by removing the cotter pins 84 and pulling the pins from the holes. This permits an occupant of the shelter to remove the latch pins and the secondary locking pin 82 to open the sliding door 18 even if the lock 80 or latch bar 74 become damaged or the door otherwise becomes jammed in its closed position.

Figure 5:
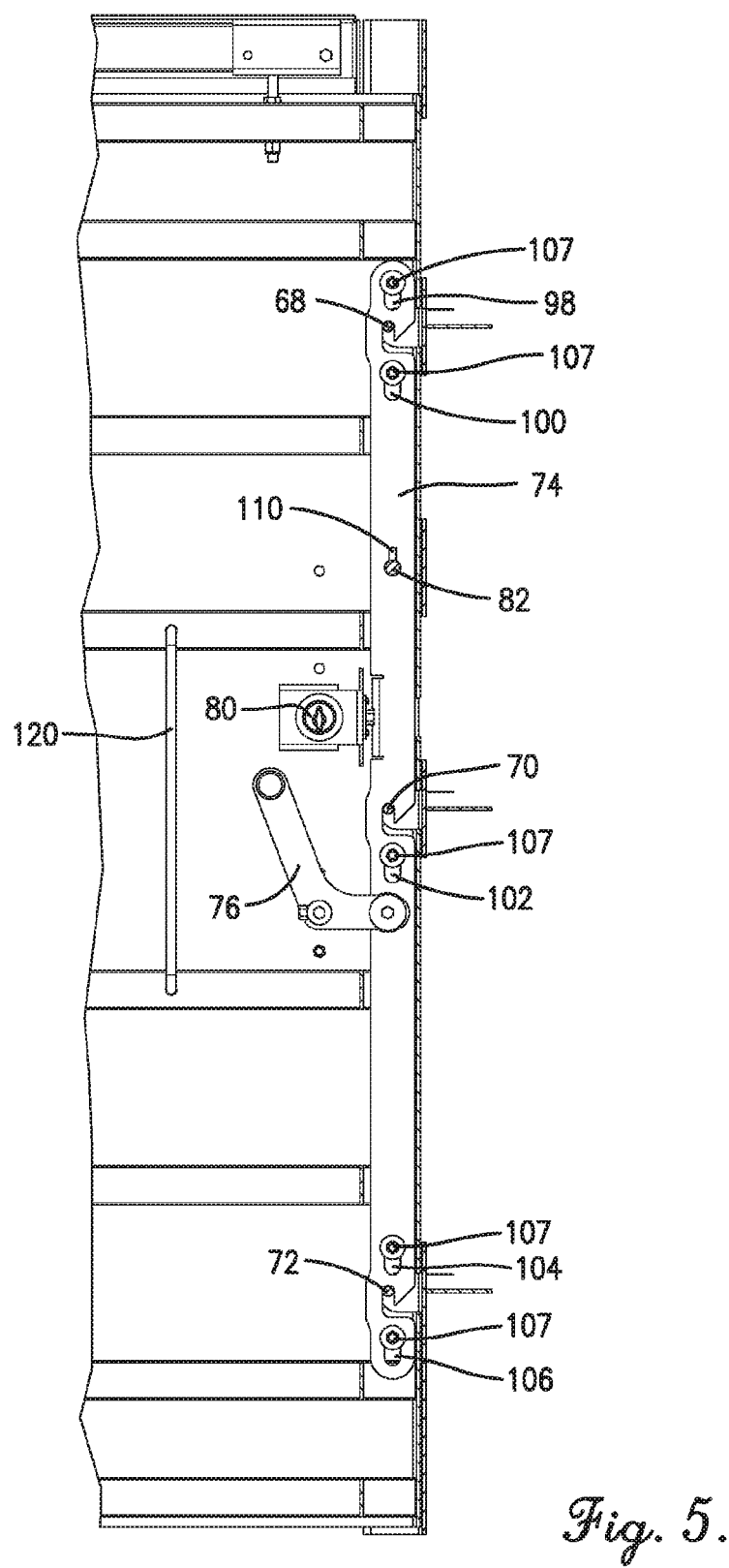
FIG. 5 is a partial vertical sectional view of the shelter door showing the latching assembly in its latched and locked position.
Figure 6:
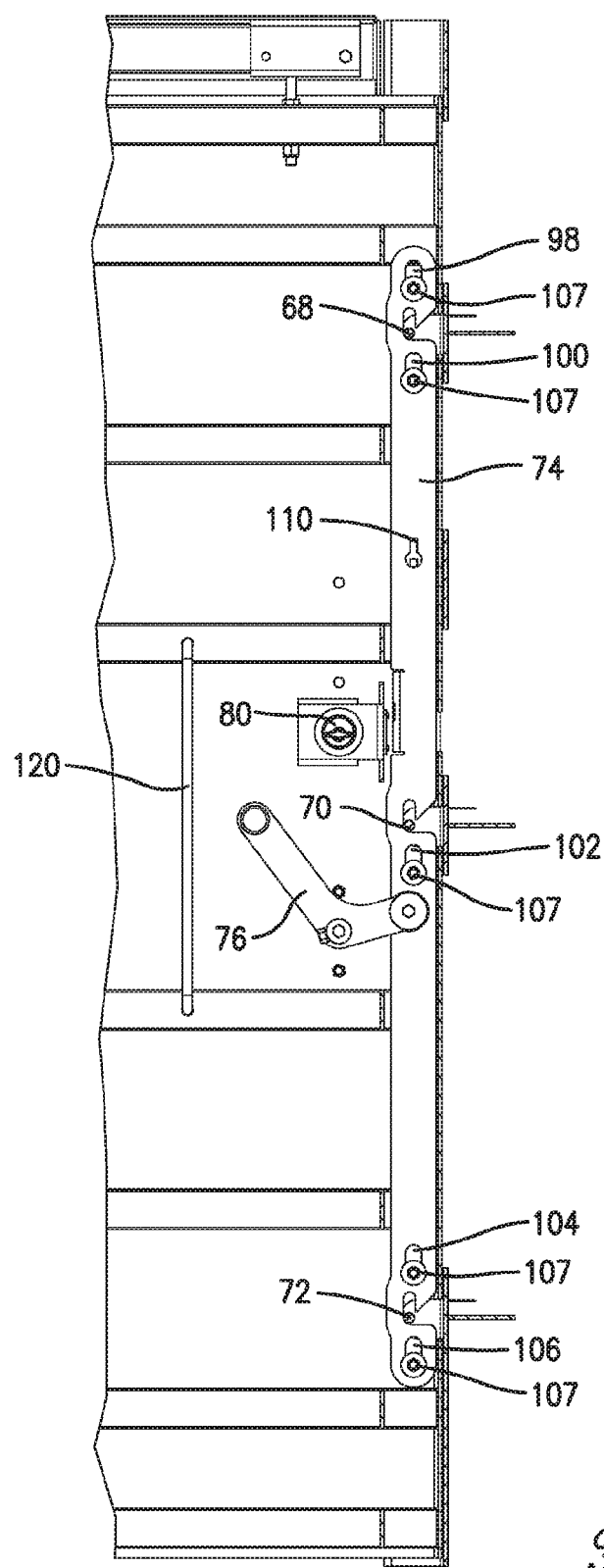
FIG. 6 is a partial vertical sectional view of the shelter door showing the latching assembly in its unlatched and unlocked position.
Figure 7:
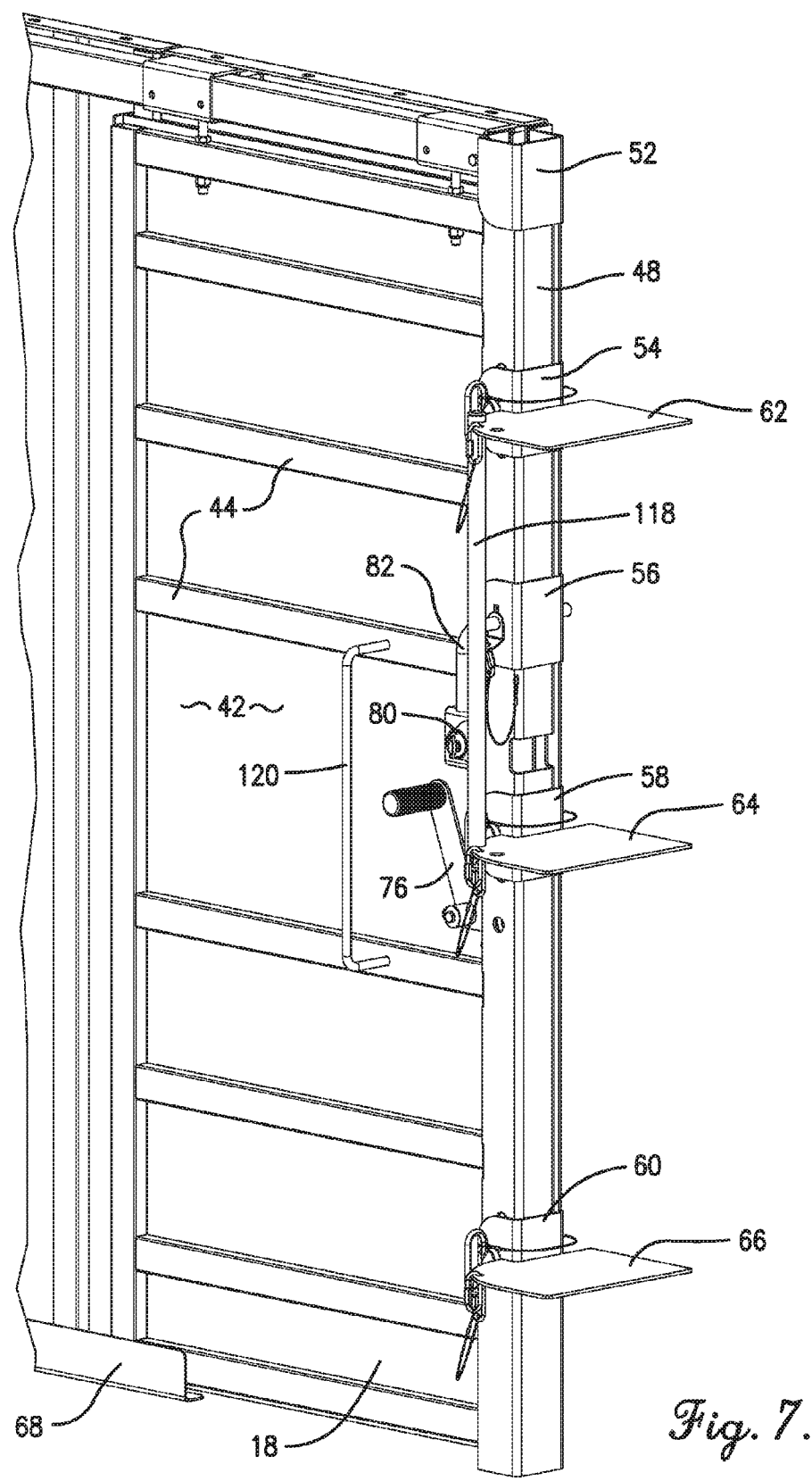
FIG. 7 is an interior perspective view of the shelter door and door jamb showing the latching assembly in its latched and locked position.
Figure 11:
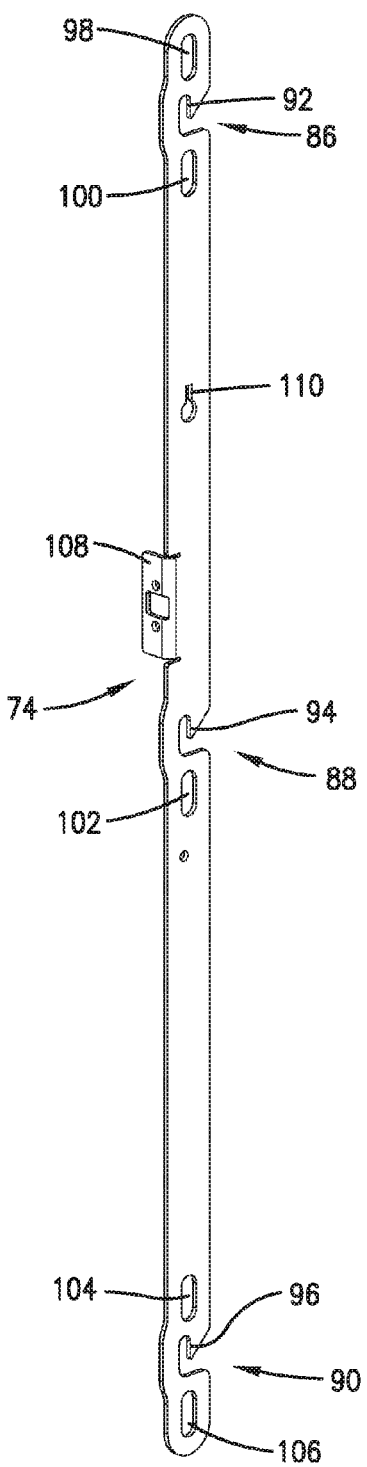
FIG. 11 is a front perspective view of the latch bar of the latching assembly.
Figure 12:
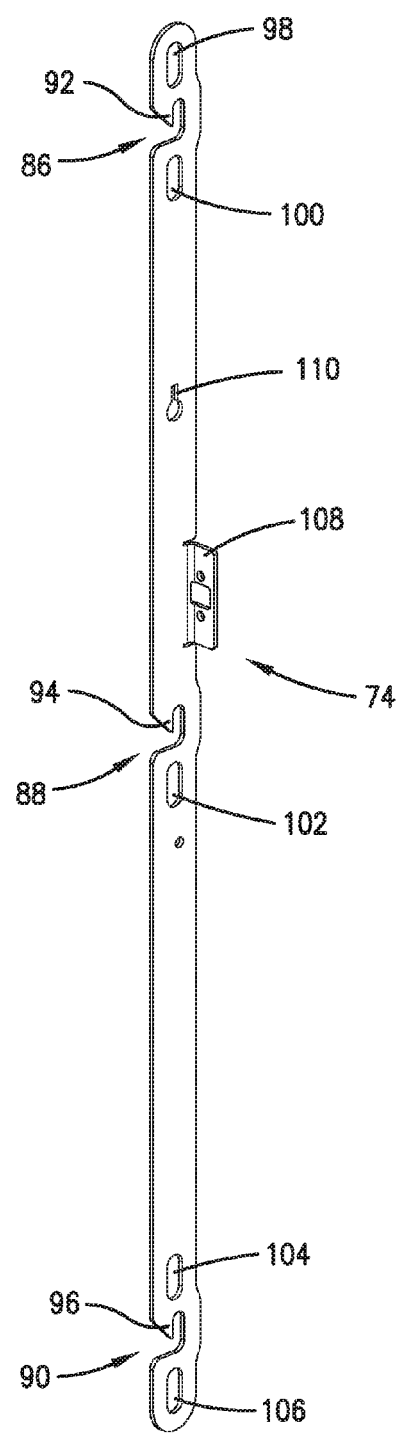
FIG. 12 is a rear perspective view of the latch bar of the latching assembly.
Figure 13:
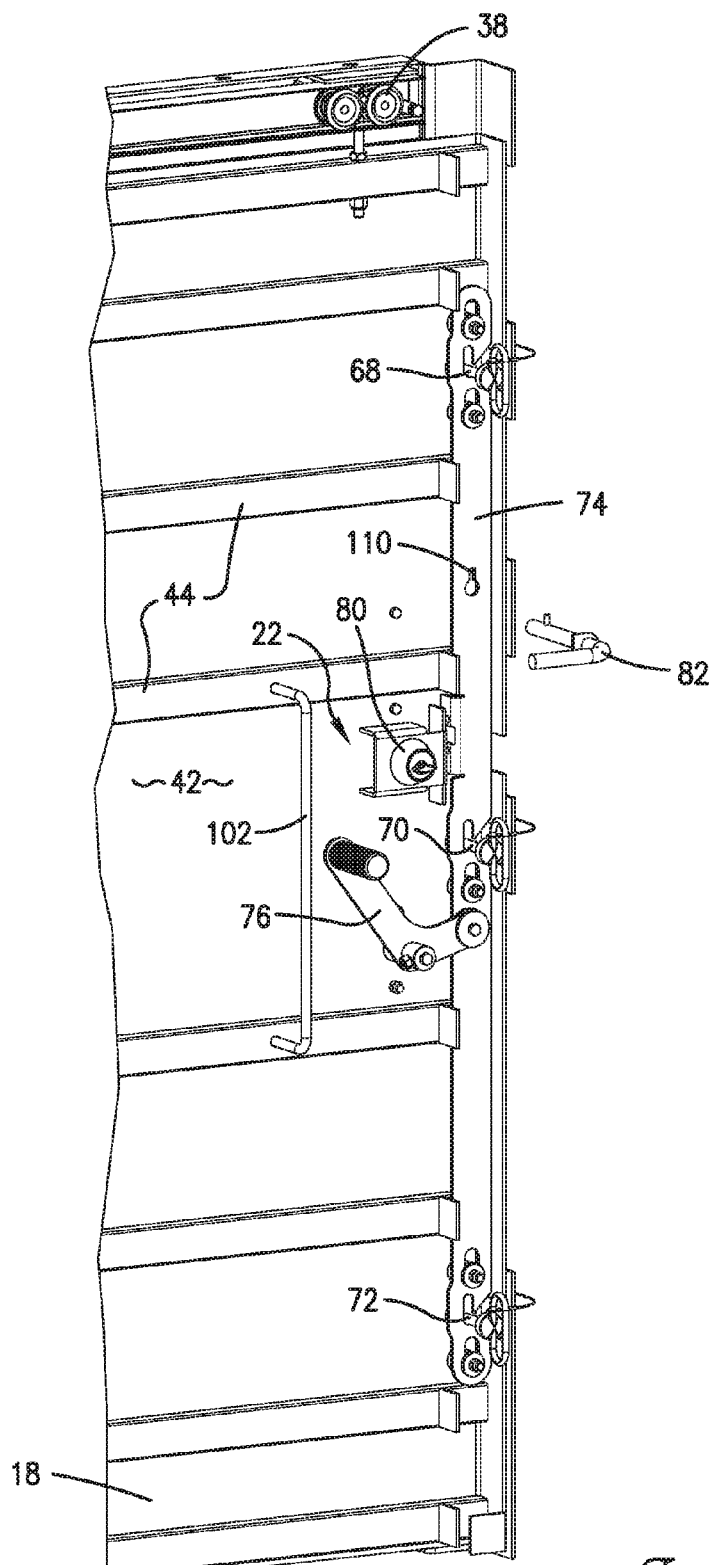
FIG. 13 is another partial vertical sectional view of the shelter door showing the latching assembly being unlocked and unlatched prior to opening the door or just after closing the door and showing the secondary locking pin partially removed from the door jamb.
Figure 14:
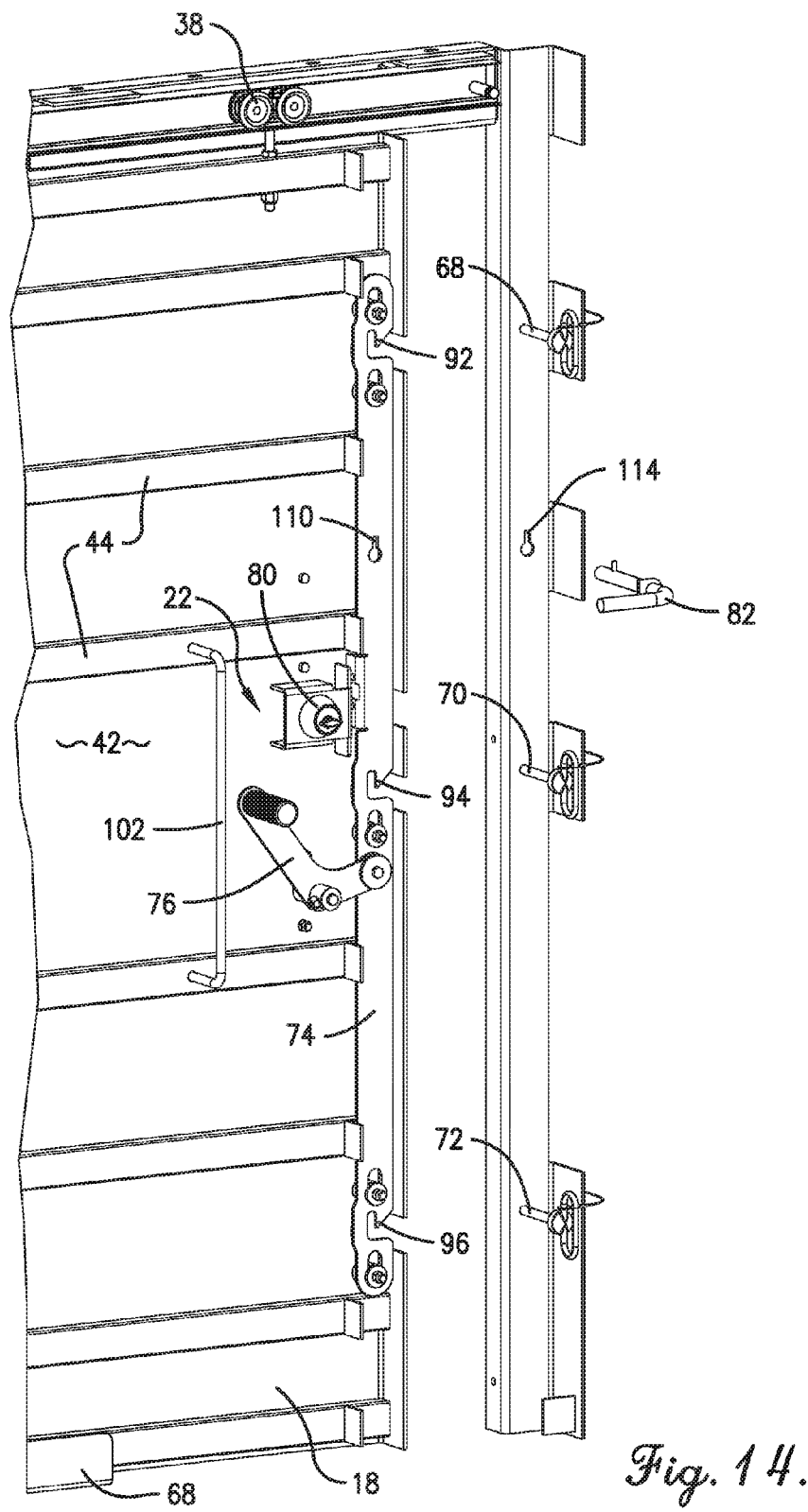
FIG. 14 is another partial vertical sectional view of the shelter door showing the latching assembly unlocked and unlatched and the door in a partially open position and showing the latch pins and secondary locking pin partially removed from the door jamb.
Figure 15:
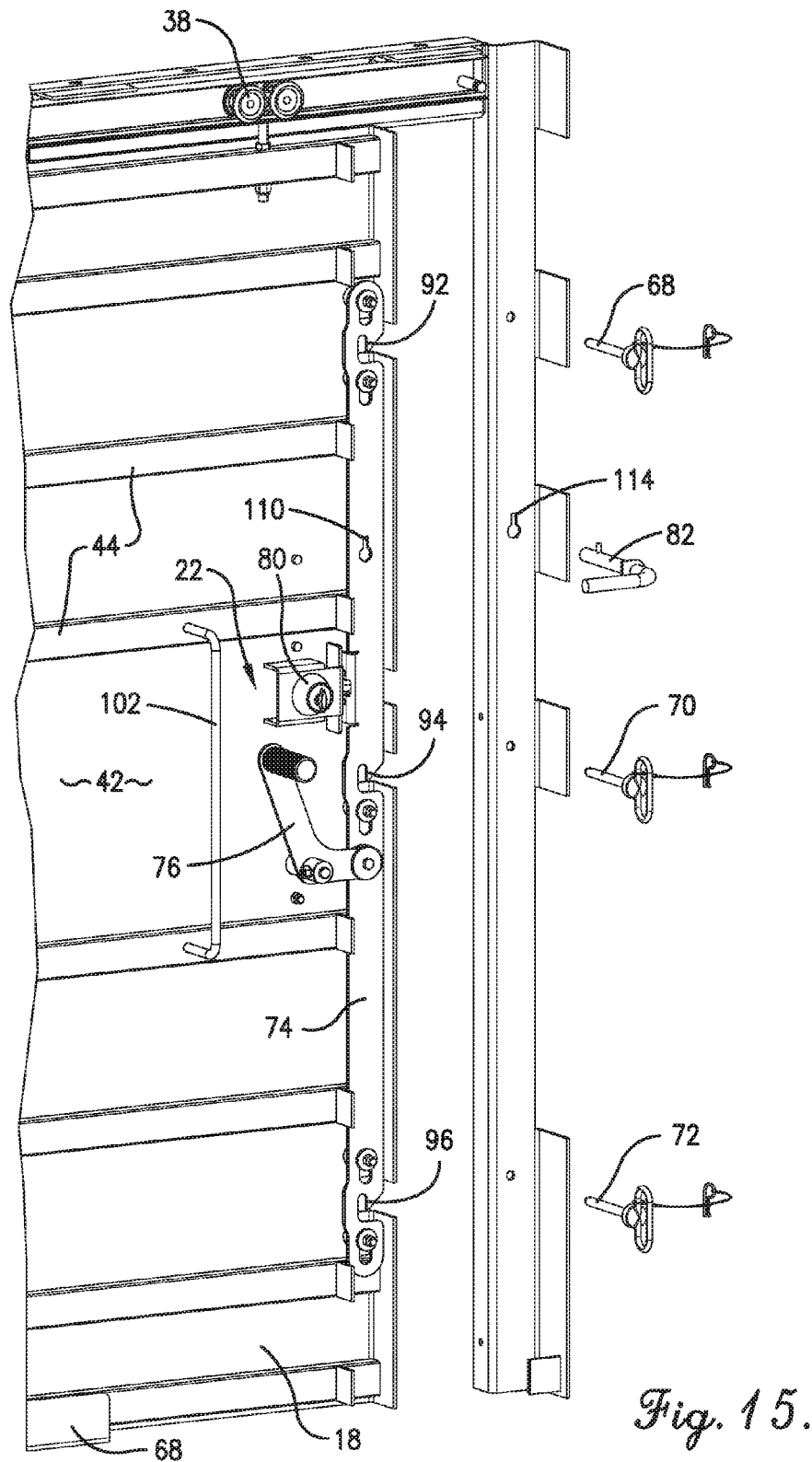
FIG. 15 is another partial vertical sectional view of the shelter door showing the latching assembly unlocked and unlatched and the door in a partially open position and showing the latch pins and secondary locking pin completely removed from the doorjamb.

The latch bar 74 is engaged and retained by the latch pins 68, 70, 72 when the door is closed. An embodiment of the latch bar 74 is best shown in FIGS. 11 and 12 and may be formed from an elongated metal bar or rod with three latch pin openings 86, 88, 90, each of which includes a ramped tooth 92, 94, 96 which slides over and engages one of the latch pins 68, 70, 72 when the door 18 is closed. An embodiment of the latch bar also includes a number of vertically extending slots 98, 100, 102, 104, 106, for receiving bolts and bushings 107 for mounting the latch bar within the U-shaped channel 46 of the door as best shown in FIGS. 5 and 6. The slots 98-106 permit the latch bar 74 to be shifted vertically relative to the door between a raised, unlatched position shown in FIG. 6 in which the teeth 92, 94, 96 of the latch pin openings disengage the latch pins 68, 70, 72 and a lowered, latched position shown in FIG. 5 in which the teeth engage the latch pins to prevent sliding of the door. The latch bar 74 also includes an integral strike plate 108 for receiving a bolt of the lock 80 and a keyhole slot 110 for receiving the secondary locking pin 82 as described below.

The latch handles 76, 78 are provided to shift the latch bar 74 between its latched and unlatched positions. The handles are pivotally mounted to the door 18 and the latch bar 74 by bolts and bushings. When the interior latch handle 76 is pivoted counter-clockwise from the perspective of FIG. 3, it lifts the latch bar to its unlatched position, and when it is pivoted clockwise, it lowers the latch bar to its latched position. The exterior latch handle 78 works the same way except in the opposite directions (clockwise to unlatch, counter clockwise to latch from perspective of FIG. 1).

The lock 80 prevents the door 18 from opening by locking the latch bar 74 in its latched position. In one embodiment, the lock 80 is a deadbolt lock with an extendable bolt that may be extended into the strike plate 108 in the latch bar 74 to prevent the latch bar from being lifted from its latched position and subsequently retracted out of the strike plate to allow vertical shifting of the latch bar 74 to its unlatched position to permit opening of the door.

The secondary locking pin 82 provides a back-up for the lock 80 and can be inserted through the key hole slot 110 and corresponding key holes 112, 114 in the flange 56 and bar 50 and a key hole 116 in the door for further locking the latch and the door in its latched position. The secondary locking pin 82 can only be removed from within the shelter and therefore prevents an intruder from opening the door even if the intruder has a key to the lock 80.

The lock 80 prevents the latch bar 74 from shifting from its latched position but does not directly hold the door 18 in its closed position. Thus, even if the lock 80 and secondary locking pin 82 both fail, the door 18 will not open unless the latch bar 74 is raised by one of the latch handles 76, 78. In other words, the lock 80 secures the latch bar 74 and not the door 18 itself. This is in contrast to a lock on an outwardly or inwardly swinging door, where the lock secures the door, and the door can open if the lock is ripped out of its socket or otherwise damaged.

To assist with opening and closing the door 18, the shelter 10 may also include a vertically extending bar 118 bolted, welded, or otherwise attached between two of the corner jamb support plates 62, 64; another vertically extending bar 120 that is bolted, welded or otherwise attached to the inside of the door 18; and another bar 122 that is bolted, welded, or otherwise attached to the outside of the door. The bars serve as handles that may be gripped by a user while opening or closing the door as described below.

Opening and closing of the door 18 will now be described in more detail. To close the door 18 from within the shelter 10, an occupant of the shelter grasps the handle 118 on the door jamb and the handle 120 on the door and pulls the door to the right until the door closes and the latch bar 74 securely latches on all three latch pins 68, 70, 72. The occupant may then rotate the interior door handle 76 clockwise to lower the latch bar 74 to its latched position so that the teeth 92, 94, 96 of the latch pin openings 86, 88, 90 trap the latch pins in the latch bar. The occupant may then rotate the lock 80 to its locked position and place the secondary locking pin 82 through the key hole slots in the door, latch bar, and door jamb and rotate it to its locked position. The door is now fully closed and locked. If the lock and secondary locking pin are damaged or otherwise disengaged, the door still won't open because the latch bar will still be in its latched position.

To open the door from within the shelter, the occupant rotates the secondary locking pin 82 and removes it from the doorjamb, unlocks the lock 80, and rotates the interior latch handle 76 counterclockwise to lift the latch bar 74 to its unlatched position off the latch pins 68, 70, 72. The occupant may then grasp the handle 120 on the door and slide the door to the left. If the latch bar 74 won't raise because the lock 80 or the latch bar 74 itself is jammed, the occupant can remove the cotter pins 84 from the latch pins 68, 70, 72, pull the latch pins out of the doorjamb, and then remove the secondary locking pin from the door. This releases the latch bar 74 from the door jamb such that the door 18 may be freely opened even if the lock 80 is still in its locked positions.

Although the invention has been described with reference to the preferred embodiment illustrated in the attached drawing figures, it is noted that equivalents may be employed and substitutions made herein without departing from the scope of the invention as recited in the claims. For example, the particular size and shape of the shelter described and illustrated herein may be altered without departing from the scope of the invention.

Having thus described the preferred embodiment of the invention, what is claimed as new and desired to be protected by Letters Patent includes the following:

1. An emergency shelter comprising:
    a plurality of reinforced walls defining a substantially enclosed interior space in which people can enter in emergencies;
    a doorway opening formed in at least one of the walls to permit entry into and exit from the enclosed interior space;
    a door mounted adjacent the doorway opening and configured to slide horizontally relative to the doorway opening between an open position and a closed position; and
    a latching assembly for latching and locking the door in the closed position, the latching assembly comprising:
        at least one latch pin mounted adjacent the doorway opening;
        a latch that is shiftable between a latched position in which it engages the latch pin and prevents opening of the door and an unlatched position in which it disengages the latch pin and allows opening of the door;
        a lock that may be shifted between a locked position to engage the latch and lock it in its latched position and an unlocked position to allow shifting of the latch to its unlatched position; and
        wherein the latch pin may be removed even when the latch is in its latched position and the lock is in its locked position to permit opening of the door when the lock or the latch has been damaged.

2. The emergency shelter as set forth in claim 1, wherein the latch is mounted to the door and vertically shiftable between its latched and unlatched positions.

3. The emergency shelter as set forth in claim 2, further comprising a latch handle pivotally mounted to the door and the latch for vertically shifting the latch between its latched and unlatched positions.

4. The emergency shelter as set forth in claim 1, further comprising a secondary locking pin that may be inserted through openings in the latch and the door to prevent shifting of the latch from its latched position and to prevent opening of the door from outside the shelter.

5. The emergency shelter as set forth in claim 1, further comprising a door jamb adjacent the doorway opening for receiving and partially surrounding a leading edge of the door to prevent movement of the door in any direction other than the horizontal sliding direction.

6. The emergency shelter as set forth in claim 1, wherein a leading edge of the door has spaced-apart flanges that define a channel between them, wherein the latch is mounted within the channel so it is protected by the spaced apart flanges.

7. The emergency shelter as set forth in claim 1, wherein a trailing edge of the door includes a flange that overlaps a flange on one of the walls when the door is closed to prevent movement of the door along an axis transverse to the horizontal sliding direction of the door so that the trailing edge of the door does not cave in when struck by debris.

8. An emergency shelter comprising:
    a number of reinforced walls that may be assembled to create a substantially enclosed interior space in which people can enter in emergencies;
    a doorway opening formed in at least one of the walls to permit entry into and exit from the interior space;
    a door;
    mounting hardware for mounting the door adjacent the doorway opening such that the door may slide horizontally relative to the doorway opening between an open position and a closed position;
    a door jamb adjacent the doorway opening for receiving and partially surrounding a leading edge of the door to prevent movement of the door along an axis transverse to the horizontal sliding direction of the door; and
    a latching assembly for latching and locking the door in the closed position, the latching assembly comprising:
        a plurality of latch pins removably mounted in holes of the doorjamb;
        a latch mounted to the door for engaging the latch pins for latching the door in the closed position, the latch being vertically shiftable between a lowered, latched position in which it engages the latch pins and prevents opening of the door and a raised, unlatched position in which it disengages the latch pins and allows the door to be opened;
        a lock secured to the door, the lock having a bolt that may be extended into an opening in the latch to prevent raising of the latch from its latched position and retracted out of the opening in the latch to allow raising of the latch to its unlatched position;
        a secondary locking pin that may be inserted through holes in the door jamb, the latch, and the door to prevent raising of the latch from its latched position and to prevent opening the door; and
        wherein the latch pins and the secondary locking pin may be removed even when the latch is in its latched position and the lock is in its locked position to permit opening of the door when the lock or the latch has been damaged.

9. The emergency shelter as set forth in claim 8, further comprising a latch handle pivotally mounted to the door and the latch for raising and lowering the latch between its latched and unlatched positions.

10. The emergency shelter as set forth in claim 8, wherein a leading edge of the door has spaced-apart flanges that define an interior channel between them, wherein the latch is mounted within the channel so it is protected by the spaced apart flanges.

11. The emergency shelter as set forth in claim 8, wherein a trailing edge of the door includes a flange that overlaps a flange on one of the walls when the door is closed to prevent movement of the door along an axis transverse to the horizontal sliding direction of the door so that the trailing edge of the door does not cave in when struck by debris.

12. An emergency shelter comprising:
- a number of reinforced walls defining a substantially enclosed interior space in which people can enter in emergencies;
- a doorway opening formed in at least one of the walls to permit entry into and exit from the enclosed interior space;
- a door formed from a steel door skin welded to a reinforced steel frame, one member of the steel frame having spaced-apart flanges that define a leading edge of the door, the flanges defining an interior channel between them;
- mounting hardware for mounting the door adjacent the doorway opening such that the door may slide horizontally relative to the doorway opening between an open position and a closed position;
- a door jamb adjacent the doorway opening for receiving and partially surrounding the leading edge of the door to prevent movement of the door along an axis transverse to the horizontal sliding direction of the door; and
- a latching assembly for latching and locking the door in the closed position, the latching assembly comprising:
  - a plurality of latch pins removably mounted in holes of the doorjamb;
  - a latch mounted to the leading edge of door within the channel formed by the spaced apart flanges, the latch being vertically shiftable between a latched position in which it engages the latch pins and prevents opening of the door and an unlatched position in which it disengages the latch pins and allows opening of the door;
  - a latch handle pivotally mounted to the door and the latch for vertically shifting the latch between its latched and unlatched positions;
  - a lock secured to the door, the lock having a bolt that may be extended into an opening in the latch to prevent vertical shifting of the latch from its latched position and retracted out of the opening in the latch to allow vertical shifting of the latch to its unlatched position;
  - a secondary locking pin that may be inserted through holes in the door jamb and the latch to prevent shifting of the latch from its latched position; and
  - wherein the latch pins may be removed even when the latch is in its latched position and the lock is in its locked position to permit opening of the door when the lock or the latch has been damaged.

13. The emergency shelter as set forth in claim 12, wherein the latch pins may only be removed from inside the shelter.

14. The emergency shelter as set forth in claim 12, wherein the door is suspended over the door opening by roller assemblies attached to an upper edge of the door.

* * * * *